(12) United States Patent
Birsan et al.

(10) Patent No.: US 11,477,090 B1
(45) Date of Patent: Oct. 18, 2022

(54) DETECTING DEPLOYMENT PROBLEMS OF CONTAINERIZED APPLICATIONS IN A MULTIPLE-CLUSTER ENVIRONMENT

(71) Applicant: Red Hat, Inc., Raleigh, NC (US)

(72) Inventors: Valentina Birsan, Toronto (CA); Sahar Ebrahimi, Toronto (CA); Feng Xiang, Toronto (CA)

(73) Assignee: Red Hat, Inc., Raleigh, NC (US)

(*) Notice: Subject to any disclaimer, the term of this patent is extended or adjusted under 35 U.S.C. 154(b) by 0 days.

(21) Appl. No.: 17/513,447

(22) Filed: Oct. 28, 2021

(51) Int. Cl.
| | | |
|---|---|---|
| *H04L 41/122* | (2022.01) | |
| *H04L 41/22* | (2022.01) | |
| *H04L 41/0895* | (2022.01) | |
| *H04L 41/0866* | (2022.01) | |

(52) U.S. Cl.
CPC ........ *H04L 41/122* (2022.05); *H04L 41/0866* (2013.01); *H04L 41/0895* (2022.05); *H04L 41/22* (2013.01)

(58) Field of Classification Search
CPC ....... H04L 41/08; H04L 41/0893–0897; H04L 41/12–122; H04L 41/22; H04L 41/34; H04L 41/342; H04L 41/344; H04L 41/40; H04L 45/02; H04L 45/036; H04L 45/76
See application file for complete search history.

(56) References Cited

U.S. PATENT DOCUMENTS

| | | | |
|---|---|---|---|
| 9,043,786 | B1 | 5/2015 | Hodge et al. |
| 9,319,286 | B2 | 4/2016 | Panuganty |
| 9,645,805 | B2 | 5/2017 | Govindaraju et al. |
| 9,645,858 | B2 | 5/2017 | Winterfeldt et al. |
| 9,727,439 | B2 | 8/2017 | Mohammed et al. |
| 9,805,322 | B2 | 10/2017 | Kelkar et al. |
| 10,284,685 | B2 | 5/2019 | Bauer et al. |

(Continued)

FOREIGN PATENT DOCUMENTS

| | | |
|---|---|---|
| CN | 107908521 A | 4/2018 |
| CN | 110262944 A | 9/2019 |

(Continued)

OTHER PUBLICATIONS

U.S. Appl. No. 17/082,725, filed Oct. 28, 2020.

(Continued)

*Primary Examiner* — Brendan Y Higa
(74) *Attorney, Agent, or Firm* — Dority & Manning, P.A.

(57) ABSTRACT

A request to identify a status of a containerized application that includes a plurality of resources and that has been deployed to at least some clusters of a plurality of different clusters is received. A placement rule is accessed that identifies a first set of clusters of the plurality of different clusters onto which, at a point in time of the accessing, the containerized application is expected as being deployed. Application deployment information is accessed that identifies a second set of clusters onto which the containerized application has been deployed. Based on the placement rule and the application deployment information, user interface imagery is generated that includes information that identifies a set of the plurality of resources of the containerized application and that identifies whether the first set of clusters is the same as the second set of clusters. The user interface imagery is presented on a display device.

20 Claims, 7 Drawing Sheets

(56) References Cited

U.S. PATENT DOCUMENTS

| | | | |
|---|---|---|---|
| 10,505,815 B2 | 12/2019 | Padala et al. | |
| 10,581,705 B2 | 3/2020 | Patil et al. | |
| 10,868,742 B2 | 12/2020 | Chitalia et al. | |
| 11,088,917 B1* | 8/2021 | McColgan | H04L 41/0895 |
| 11,240,128 B2* | 2/2022 | Chitalia | G06F 11/3452 |
| 2018/0287902 A1 | 10/2018 | Chitalia et al. | |
| 2020/0218580 A1 | 7/2020 | Kim | |
| 2020/0241903 A1* | 7/2020 | Wang | H04L 41/12 |
| 2020/0348984 A1 | 11/2020 | Giannetti et al. | |

FOREIGN PATENT DOCUMENTS

| | | |
|---|---|---|
| WO | 2014145777 A1 | 9/2014 |
| WO | 2020017844 A1 | 1/2020 |

OTHER PUBLICATIONS

U.S. Appl. No. 17/107,355, filed Nov. 30, 2020.
U.S. Appl. No. 17/502,534, filed Oct. 15, 2021.
Author Unknown, "Access Kubernetes Resources from the Azure Portal," Microsoft, Dec. 16, 2020, https://docs.microsoft.com/en-us/azure/aks/kubernetes-portal, 6 pages.
Author Unknown, "Application and Hybrid Application Resources," IBM Corporation, 2020, https://www.ibm.com/docs/en/cloud-paks/cp-management/2.2.x?topic=management-application-resources, 9 pages.
Author Unknown, "How to use the Pega Autonomic Event Services Enterprise Health console," Pegasystems Inc., Sep. 25, 2019, https://community.pega.com/knowledgebase/articles/pega-autonomic-event-services/how-use-pega-autonomic-event-services-enterprise-health-console, 24 pages.
Author Unknown, "Viewing application composition using the Topology view," Red Hat, Feb. 2020, https://docs.openshift.com/container-platform/4.2/applications/application_life_cycle_management/odc-viewing-application-composition-using-topology-view.html, 9 pages.
Author Unknown, "Web UI (Dashboard)," The Linux Foundation, May 12, 2021, https://kubernetes.io/docs/tasks/access-application-cluster/web-ui-dashboard/, 5 pages.
Calasanz, Rafael Tolosana, et al., "Towards the Scientific Cloud Workflow Architecture," 5th International Workshop on ADVANCEs in ICT Infrastructures and Services (ADVANCE 2017), Jan. 2017, Evry, France, 11 pages.
Casperson, M., "Alternative Kubernetes Dashboards," Octopus Deploy, Sep. 22, 2020, https://octopus.com/blog/alternative-kubernetes-dashboards, 14 pages.
Haider, H., "The Ultimate Guide to the Kubernetes Dashboard: How to Install, Access, Authenticateand Add Heapster Metrics," replex, Apr. 19, 2019, https://www.replex.io/blog/how-to-install-access-and-add-heapster-metrics-to-the-kubernetes-dashboard, 15 pages.
Maenhaut, Pieter-Jan, et al., "Resource Management in a Containerized Cloud: Status and Challenges," Journal of Network and Systems Management, Nov. 2019, 51 pages.
Muralidharan, Shapna, et al., "Monitoring and Managing IoT Applications in Smart Cities Using Kubernetes," Cloud Computing 2019 : The Tenth International Conference on Cloud Computing, GRIDs, and Virtualization, 2019, 7 pages.
Nguyen, Dinh Khoa, et al., "Blueprinting Approach in Support of Cloud Computing," Future Internet 2012, 4, 322-346; doi:10.3390/fi4010322, Mar. 21, 2012, 26 pages.

* cited by examiner

DETECTING DEPLOYMENT PROBLEMS OF CONTAINERIZED APPLICATIONS IN A MULTIPLE-CLUSTER ENVIRONMENT

BACKGROUND

Container orchestration systems automate the deployment, scaling, and management of containerized applications among nodes in a cluster.

SUMMARY

The examples disclosed herein maintain information regarding the clusters to which a containerized application has been deployed.

In one example a method is provided. The method includes receiving, by a computing system comprising one or more processor devices, a request to identify a status of a containerized application that has been deployed to at least some clusters of a plurality of different clusters, the containerized application including a plurality of resources, each cluster including a plurality of nodes onto which the containerized application can be deployed. The method further includes accessing a placement rule that identifies a first set of clusters of the plurality of different clusters onto which, at a point in time of the accessing, the containerized application is expected as being deployed. The method further includes accessing application deployment information that identifies a second set of clusters onto which the containerized application has been deployed. The method further includes, based on the placement rule and the application deployment information, generating user interface imagery that includes information that identifies a set of the plurality of resources of the containerized application, and identifies whether the first set of clusters is the same as the second set of clusters. The method further includes presenting, on a display device, the user interface imagery.

In another example a computing system provided. The computing system includes one or more computing devices comprising one or more processor devices, the one or more processor devices to receive a request to identify a status of a containerized application that has been deployed to at least some clusters of a plurality of different clusters, the containerized application including a plurality of resources, each cluster including a plurality of nodes onto which the containerized application can be deployed. The one or more processor devices are further to access a placement rule that identifies a first set of clusters of the plurality of different clusters onto which, at a point in time of the accessing, the containerized application is expected as being deployed. The one or more processor devices are further to access application deployment information that identifies a second set of clusters onto which the containerized application has been deployed. Based on the placement rule and the application deployment information, the one or more processor devices are further to generate user interface imagery that includes information that identifies a set of the plurality of resources of the containerized application, and identifies whether the first set of clusters is the same as the second set of clusters. The one or more processor devices are further to present, on a display device, the user interface imagery.

In another example a non-transitory computer-readable storage medium is provided. The non-transitory computer-readable storage medium includes executable instructions to cause one or more processor devices to receive a request to identify a status of a containerized application that has been deployed to at least some clusters of a plurality of different clusters, the containerized application including a plurality of resources, each cluster including a plurality of nodes onto which the containerized application can be deployed. The instructions further cause the one or more processor devices to access a placement rule that identifies a first set of clusters of the plurality of different clusters onto which, at a point in time of the accessing, the containerized application is expected as being deployed. The instructions further cause the one or more processor devices to access application deployment information that identifies a second set of clusters onto which the containerized application has been deployed. The instructions further cause the one or more processor devices to, based on the placement rule and the application deployment information, generate user interface imagery that includes information that identifies a set of the plurality of resources of the containerized application, and identifies whether the first set of clusters is the same as the second set of clusters. The instructions further cause the one or more processor devices to present, on a display device, the user interface imagery.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

The term "cluster" as used herein refers to a set of compute nodes, such as computing devices and/or virtual machines, on which cluster control plane software (hereinafter "control plane") is installed and on which containers can be initiated at the direction of the control plane. Certain container orchestration systems, such as Kubernetes-based container orchestration systems, are capable of deploying a containerized application across one or more clusters. Where a containerized application may be deployed across multiple clusters, the clusters may be geographically distant from one another and/or managed by entities completely independent from one another. For example, a container orchestration system may deploy an application to a cluster maintained in an AWS® cloud computing environment, a cluster maintained in an Azure® cloud computing environment, and a Google® cloud computing environment (i.e., GCP).

A containerized application is composed of a plurality of resources and one or more container images. The term "resource" as used herein refers to a component of a containerized application that is managed by the container orchestration system and for which, if requested, the container orchestration system will return information specific to the resource. In a Kubernetes-based container orchestration system, each resource of an application is typically defined in a configuration file, such as a YAML Ain't Markup Language (YAML) file, and has a "kind" attribute (sometimes referred to herein as "type") and a "name" attribute. When a containerized application is deployed by a Kubernetes-based container orchestration system, the container orchestration system implements the resources in data structures, sometimes referred to as objects, which govern runtime characteristics of the containerized application. Thus, when a containerized application is deployed on a cluster, objects that correspond to the resources are generated on the cluster. The term "object" may be used herein synonymously to refer to a "resource" of a containerized application. Moreover, when a containerized application is deployed on a cluster, one or more containers are initiated from container images on worker nodes of the clusters. The container(s) are the executing processes of the containerized application and utilize memory resources of a worker node, processor resources of a worker node, and the like.

It is increasingly desirable to automate the deployment of containerized applications across a set of clusters for scalability and reliability purposes. Some container orchestration systems, such as Kubernetes-based container orchestration systems, include a hub cluster controller that interfaces with multiple managed clusters to control the deployment of containerized application on such managed clusters. In some implementations, the hub cluster controller includes a mechanism for identifying a set of clusters onto which a containerized application should automatically be deployed, sometimes referred to as a placement rule. A placement rule can identify a condition that governs a subset of clusters from a set of potential clusters onto which a containerized application should be automatically deployed. The condition may identify a cluster characteristic, and each cluster that matches that characteristic is included in the subset of clusters. As an example, in the Kubernetes container orchestration system, a label is a key/value pair that can be attached to an entity, such as a cluster. A cluster may have a label such as "usage/development", or "usage/production", or "usage/tenantA". A placement rule may indicate that a containerized application should automatically be deployed to all clusters that have a key of "usage" and a value of "development" or "production".

The placement rule is maintained in a data structure, such as an object, that is accessible by the hub cluster controller. The hub cluster controller maintains in realtime, in the placement rule, a current list of clusters that meet the condition identified in the placement rule. Thus, the placement rule may indicate, at a particular point in time, that ClusterA and ClusterB meet the specified condition and are the clusters on which the containerized application should be currently deployed. If subsequently a ClusterF is added to the set of clusters, and the ClusterF contained a "usage/development" label and therefore meets the condition identified in the placement rule, the placement rule is automatically updated to the add ClusterF to the list, and the containerized application is automatically deployed to ClusterF.

The placement rule can be queried at any time to determine the clusters on which the containerized application should be currently deployed. For example, an operator may interact with a user interface to obtain information about the managed clusters and other aspects of the container orchestration system, including, for example, the current list of clusters identified in a placement rule. However, the actual clusters on which a containerized application has been deployed and the clusters identified in the placement rule can differ under certain circumstances. One such circumstance is when the hub cluster controller can no longer reach a managed cluster on which a containerized application was previously deployed. A cluster can become unreachable for any number of reasons, including network issues, computing device faults, or the like. When a cluster becomes unreachable, the cluster is removed from the list of clusters in the placement rule. However, the containerized application may have previously been deployed on the cluster that is unreachable and, in fact, may still be operating on the unreachable cluster or at least still be deployed on the cluster and thus be incurring costs associated with cluster usage.

The examples disclosed herein maintain information regarding the clusters to which a containerized application has been deployed. The information can be accessed and compared to the current list of clusters maintained in a placement rule, and user interface imagery can be generated and presented on a display device to identify situations in which the current list of clusters maintained in a placement rule differ from the list of clusters on which a containerized application has been deployed. In response to the discrepancy, an operator can determine the cause of the problem and take appropriate actions to resolve the problem.

Figure 1:
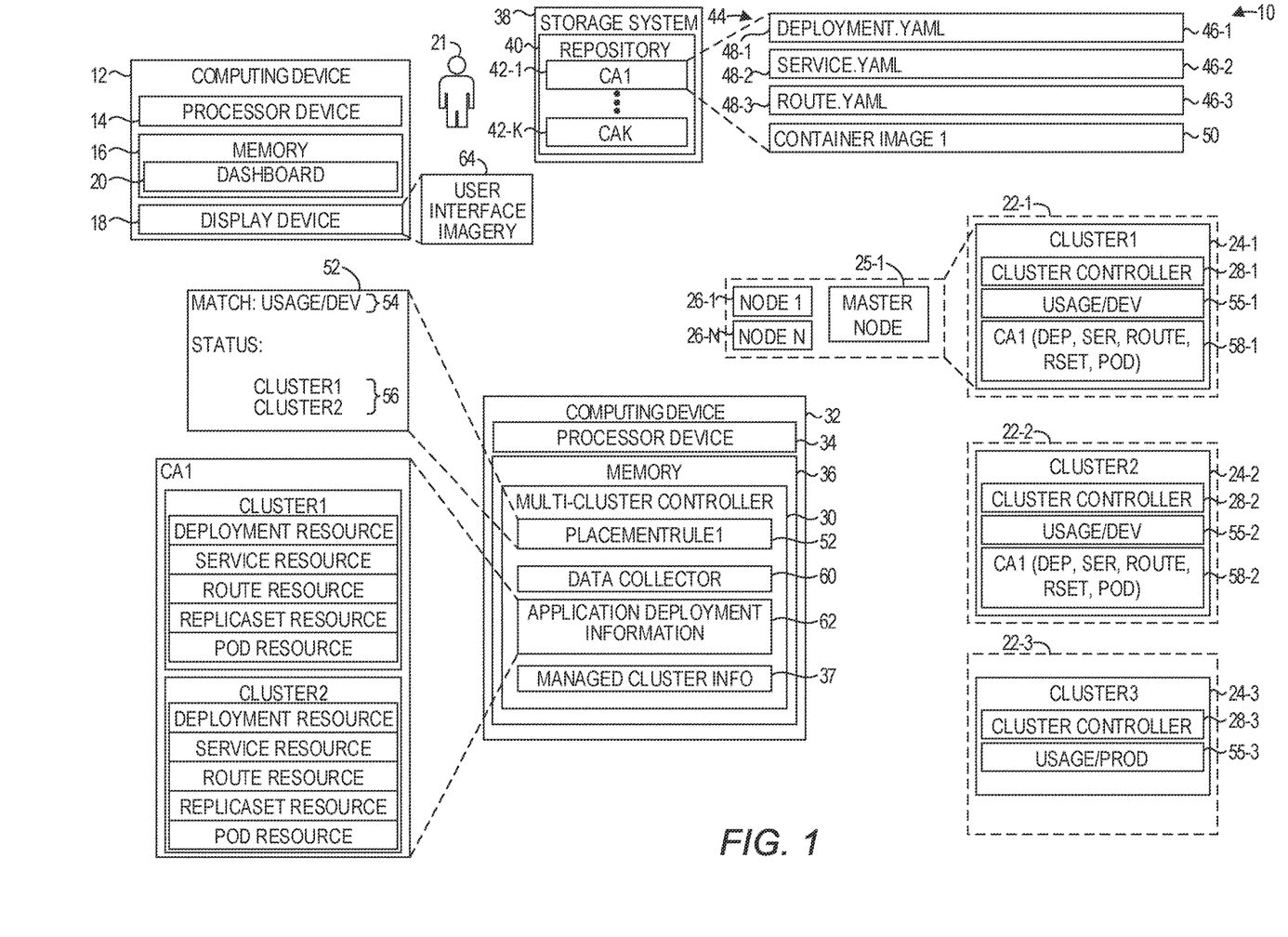
FIG. 1 is a block diagram of a runtime environment in which examples of detecting deployment problems of containerized applications in a multiple-cluster environment can be implemented.

FIG. 1 is a block diagram of a runtime environment 10 in which examples of detecting deployment problems of containerized applications in a multiple-cluster environment can be implemented. The runtime environment 10 includes a computing device 12, which in turn includes a processor device 14, a memory 16, and a display device 18. The memory 16 includes a dashboard 20. The dashboard 20, as will described in greater detail herein, is a component that generates and presents information on the display device 18 in response to user inputs from a user, such as an operator 21. It is noted that, while the dashboard 20 is a component of the computing device 12, functionality implemented by the dashboard 20 may be attributed to the computing device 12 generally. Moreover, in examples where the dashboard 20 comprises software instructions that program the processor device 14 to carry out functionality discussed herein, functionality implemented by the dashboard 20 may be attributed herein to the processor device 14. It is further noted that, while the examples will be described as being implemented at least in part on the computing device 12 by the dashboard 20, it is apparent that in other implementations the functionality implemented by the dashboard 20 could comprise a number of different components, some of which may execute concurrently on other computing devices.

The runtime environment 10 includes a plurality of container orchestration systems 22-1-22-3 (generally, container orchestration systems 22), each of which is configured to manage containerized applications across a corresponding cluster of nodes. The term "containerized application" as used herein refers to an application that comprises one or more container images, and is initiated and managed via a container orchestration system. When executed, a container image is initiated as a Linux® container, wherein the Linux® kernel features cgroups and namespaces are used to isolate processes from one another. A container image is often created from a containerization technology, such as, by way of non-limiting example, Docker®, or the like.

The term "container orchestration system" refers to a system that automates the deployment, scaling and management of containerized applications among nodes in a cluster. The Kubernetes® container orchestration system (Kubernetes.io) is one example of a container orchestration system. As discussed above, a resource is a component of a containerized application that is managed by the container orchestration system and for which, if requested, the container orchestration system will return information specific to the resource.

It is noted that the examples will be discussed herein in the context of the Kubernetes® container orchestration system and utilize terminology used in the Kubernetes® container orchestration system; however, the examples are applicable to any container orchestration system capable of deploying, scaling, and managing containerized applications among nodes in a cluster.

The container orchestration system 22-1 implements a cluster 24-1 ("CLUSTER1") that includes a master node 25-1 and a plurality of worker nodes 26-1-26-N. Each node 25-1, 26-1-26-N may comprise a computing host (e.g., a bare metal machine), or a virtual machine, and thus each includes a processor device and a memory which have been omitted from FIG. 1 due to space limitations. The container orchestration system 22-1 includes a cluster controller 28-1 that deploys, scales, and manages containerized applications by distributing containerized applications across the plurality of worker nodes 26-1-26-N. As will be discussed in greater detail below, the cluster controller 28-1 may deploy a containerized application in response to instructions from a multi-cluster controller (MCC) 30. The container orchestration system 22-1 may comprise any suitable container orchestration system capable of deploying containerized applications across a cluster of nodes. The term "deploy" as used herein refers to an installation and/or set up process of a resource of a containerized application on a cluster. A resource may not be an executing process, but rather a bundle of data, sometimes maintained as an object, that governs runtime characteristics of the containerized application. In Kubernetes®, a pod resource corresponds to one or more containers (i.e., executing processes) that are said to "run" in the same pod.

While the control plane of the container orchestration system 22-1, solely for purposes of illustration, is illustrated as being embodied in a single component identified as the cluster controller 28-1, in practice, the control plane may be implemented by any number of modules, and may be distributed across the master node 25-1 and the worker nodes 26-1-26-N.

The container orchestration system 22-2 implements a cluster 24-2 ("CLUSTER2") that includes a cluster controller 28-2 that deploys, scales, and manages containerized applications by distributing containerized applications across a plurality of nodes. Note that the container orchestration system 22-2 also includes a master node and a plurality of worker nodes, similar to the container orchestration system 22-1, which have been omitted from FIG. 1 due to space limitations. Similarly, the container orchestration system 22-3 implements a cluster 24-3 ("CLUSTER3") that includes a cluster controller 28-3 that deploys, scales, and manages containerized applications by distributing containerized applications across a plurality of nodes. Again, the container orchestration system 22-3 includes a master node and a plurality of worker nodes, similar to the container orchestration system 22-1, which have been omitted from FIG. 1 due to space limitations.

The container orchestration systems 22-1-22-3 may each be independent of one another, managed and controlled by independent entities, and geographically remote from one another. For example, the container orchestration system 22-1 may be implemented by a first cloud computing environment provider, such as Amazon®, the container orchestration system 22-2 may be implemented by a second cloud computing environment provider, such as Microsoft®, and the container orchestration system 22-3 may be implemented a third cloud computing environment provider, such as Google®.

The container orchestration systems 22-1-22-3 form a multiple-cluster environment in conjunction with the MCC 30. The MCC 30 manages the deployment of containerized applications onto the clusters 24-1-24-3 via communications with the container orchestration systems 22-1-22-3. In some implementations the MCC 30 maintains managed clusters information 37 that identifies the clusters 24-1-24-3 and/or container orchestration systems 22-2-22-3 as the clusters being managed by the MCC 30. The MCC 30 may comprise any suitable multiple cluster controller capable of causing the deployment of containerized applications onto a plurality of different clusters. In some implementations, the MCC 30 comprises the Red Hat® Advanced Cluster Management platform. While for purposes of illustration the MCC 30 is illustrated as being independent of a container orchestration system, in other implementations the MCC 30 may be a component in a container orchestration system, either one of the container orchestration systems 22-1-22-3 or a separate container orchestration system. The MCC 30 in this example executes on a computing device 32 that includes a processor device 34 and a memory 36.

The runtime environment 10 includes a storage system 38 that includes one or more storage devices. The storage system 38 includes a repository 40 of a plurality of containerized applications 42-1-42-K (hereinafter "applications" for purposes of brevity, and generally referred to as applications 42). The applications 42 can be deployed on one or more of the clusters 24. The application 42-1 includes application information 44 in the form of one or more files 46-1-46-3, which define a corresponding plurality of pre-deployment resources 48-1-48-3 that will be deployed onto a cluster 24 to implement the application 42-1. The application 42-1 also includes at least one container image 50. In some implementations, the information in the files 46-1-46-3 that define the resources 48 may utilize a certain syntax or format, such as YAML. The container image 50 implements desired functionality for the containerized application 42-1, such as an online store functionality, a tax system functionality, a word processor functionality, or the like.

In this example, the containerized application 42-1 is a Kubernetes® application, and the file 46-1 defines a deployment (DMENT) resource; the file 46-2 defines a service resource; and the file 46-3 defines a route resource. As will be discussed in greater detail below, the files 46-1-46-3 are accessed in the process of deploying the resources 48-1-48-3 of the containerized application 42-1 onto one or more of the clusters 24-1-24-3.

An example of the contents of the file 46-1 is provided below in Table 1.

TABLE 1

```
apiVersion: apps/v1
  kind: Deployment
  metadata:
    name: helloworld-app-deploy
    labels:
      app: helloworld-app
  spec:
    selector:
      matchLabels:
        app: helloworld-app
    replicas: 1
    template:
      metadata:
        labels:
          app: helloworld-app
    spec:
      containers:
      - name: helloworld-app-container
        image: "quay.io/fxiang1/helloworld:0.0.1"
        imagePullPolicy: IfNotPresent
        ports:
          - containerPort: 3002
        env:
          - name: "PORT"
            value: "3002"
        resources:
          limits:
            cpu: 200m
            memory: 256Mi
          requests:
            cpu: 50m
            memory: 64Mi
```

The resource 48-1 defined by the file 46-1 is a Kubernetes® deployment resource and may include information such as the name and location of the container image 50, the name of the deployment resource (helloworld-app-deploy), a port number via which the container initiated from the container image 50 can be accessed, memory and processing limits for the container, a number of replicas, and the like, all of which may be used by a container orchestration system 22 during deployment of the containerized application 42-1. A deployment resource in Kubernetes® may be used, for example, to identify a desired number of copies of a container.

An example of the contents of the file 46-2 is provided below in Table 2.

TABLE 2

```
apiVersion: v1
  kind: Service
  metadata:
    name: helloworld-app-svc
    labels:
      app: helloworld-app
  spec:
    type: NodePort
    ports:
      - port: 3002
        targetPort: 3002
        protocol: TCP
    selector:
      app: helloworld-app
```

The resource 48-2 defined by the file 46-2 is a Kubernetes® service resource and may include information such as the name of the service resource (helloworld-app-svc), a port number via which the container initiated from the container image 50 can be accessed, and the like, all of which may be used by a container orchestration system 22 during deployment of the containerized application 42-1. A service resource in Kubernetes® is a mechanism for exposing a running container as a network service.

An example of the contents of file 46-3 is provided below in Table 3.

TABLE 3

```
kind: Route
apiVersion: route.openshift.io/v1
metadata:
  name: helloworld-app-route
  labels:
    app: helloworld-app
spec:
  to:
    kind: Service
    name: helloworld-app-svc
    weight: 100
  port:
    targetPort: 3002
  wildcardPolicy: None
```

The resource 48-3 defined by the file 46-3 is a Kubernetes® route resource and may include information such as the name of the route resource (helloworld-app-route), a port number via which the container initiated from the container image 50 can be accessed, and the like, all of which may be used by a container orchestration system 22 during deployment of the containerized application 42-1. A route service in Kubernetes® implements a mechanism to expose a service by giving the service an externally reachable hostname.

The MCC 30 operates to deploy containerized applications 42 in accordance with one or more placement rules 52. The placement rule 52 identifies a condition 54 that identifies a characteristic of the clusters 24 onto which any containerized application 42 that is linked to the placement rule 52 is to be deployed. The linkage between the containerized application 42 and the particular placement rule 52 may be identified, for example, in the placement rule 52, identified in one of the files 46, or via any other suitable correlation mechanism. In this example, the condition 54 contains a key-value pair that identifies the characteristic as those clusters 24 that have a key of "usage" and a value of "DEV". The cluster 24-1 includes a key-value pair 55-1 of "USAGE" and "DEV"; the cluster 24-2 includes a key-value pair 55-2 of "USAGE" and "DEV"; and the cluster 24-3 includes a key-value pair 55-3 of "USAGE" and "PROD".

The MCC 30 maintains a list 56 in the placement rule 52 of those clusters 24-1-24-3 that match the characteristic, and that are reachable by the MCC 30. A cluster 24 is reachable if the MCC 30 can communicate with the corresponding container orchestration system 22. Under certain situations, a cluster 24 that was once reachable may subsequently become unreachable for any number of reasons, such as a network fault somewhere between the computing device 32 and the computing device on which a cluster controller 28 executes, a fault of a computing device on which a cluster controller 28 executes, maintenance of a cluster 24, and the like. If a cluster 24 becomes unreachable, the MCC 30 removes the cluster 24 from the list 56. If a new cluster 24 is added to the plurality of clusters 24, and the new cluster 24 contains a key-value pair of "USAGE" and "PROD", then the MCC 30 adds the new cluster 24 to the list 56 and automatically deploys any containerized applications 42 linked to the placement rule 52 to the new cluster 24.

In this example, at the point in time illustrated in FIG. 1, the list 56 identifies the clusters 24-1 and 24-2 as meeting the condition 54. Also in this example, the containerized application 42-1 is linked to the placement rule 52, and thus the MCC 30 caused the containerized application 42-1 to be deployed onto the clusters 24-1-24-2. For example, the MCC 30 instructed the container orchestration system 22-1 to deploy the containerized application 42-1 and instructed the container orchestration system 22-2 to deploy the containerized application 42-2. The MCC 30 did not instruct the container orchestration system 22-3 to deploy the containerized application 42-3 because the cluster 24-3 does not meet the condition 54.

The containerized application 42-1 may be deployed onto a cluster 24 in a designated namespace. A namespace is an isolation mechanism implemented by an operating system, such as the Linux operating system, to isolate applications from one another, and to define name scope. Thus, applications executing in one namespace may be unaware of applications running in another namespace, even though such applications are running on the same host computer.

To deploy the containerized application 42-1, the cluster controller 28-1 generates a plurality of deployed resources 58-1 in a designated namespace based on the resources 48-1-48-3 defined by the files 46-1-46-3. The deployed resources 58-1 may comprise objects stored in memory that control aspects of how the containerized application 42-1 will operate. A single pre-deployment resource 48 defined in a file 46 may cause the deployment of a plurality of deployed resources 58. For example, the pre-deployment deployment resource 48-1 defined in the file 46-1 may cause the deployment of a deployed deployment (DEP) resource, a deployed replicaset (RSET) resource, and a deployed pod resource. The deployment command(s) also cause the cluster controller 28-1 to initiate one or more containers (i.e., running processes) on one or more of the nodes 26-1-26-N. In Kubernetes®, running containers are represented by a pod resource. In this example, the resources 48-1-48-3 defined in the files 46-1-46-3 cause the cluster controller 28-1 to deploy a deployment resource based on the file 46-1, a service (SER) resource based on the file 46-2, and a route (ROUTE) resource based on the file 46-3. Based on the deployment resource 48-1, the cluster controller 28-1 also deploys a replicaset (RSET) resource, and a pod (POD) resource. Each of the resources contain configuration and real-time information, such as status information, about the corresponding resource. Upon request, the cluster controller 28-1 can provide the contents of the resources 58-1 to a requesting application to provide, to the requesting application, information about the real-time and configuration information. The contents may be formatted, for example, as YAML.

In a similar manner, to deploy the containerized application 42-1 on the cluster 24-2, the cluster controller 28-2 generates a plurality of deployed resources 58-2 in a designated namespace based on the resources 48-1-48-3 defined by the files 46-1-46-3.

The environment 10 also includes a data collector 60 that is configured to periodically query the cluster controllers 28-1-28-3 and request, from each cluster controller 28, a list of resources deployed on the respective cluster controller 28 and the contents of such resources. The data collector 60 determines the containerized application 42 with which each resource is associated, and maintains application deployment information 62 for each containerized application 42 that identifies the clusters 24 on which resources of the containerized applications 42 have been deployed. In one implementation, each resource associated with a containerized application 42 may include a key-value pair that identifies the containerized application 42 with which the resource is associated. The data collector 60 may analyze the contents of each resource provided by the cluster controllers 28 and parse the contents to locate the appropriate key value pair. For example, each resource may include a key of "app" and a value of "helloworld-app" to identify the resources as components of the "helloworld-app" containerized application.

In this example, the application deployment information 62 indicates that each of the resources associated with the containerized application 42-1 has been deployed on the clusters 24-1 and 24-2. The data collector 60 may repeat this process periodically, such as every 10 seconds, every 30 seconds, every minute, or the like, and thus the application deployment information 62 is an accurate reflection of the resources deployed on the clusters 24-1-24-3 as of the last iteration of the data collector 60. Notably, even if a cluster controller 28 becomes unreachable such that the data collector 60 cannot communicate with a cluster controller 28 that was previously reachable, the data collector 60 does not remove from the application deployment information 62 resources that were previously identified as having been deployed on the corresponding cluster 24. The data collector 60 only removes a resource previously identified as being deployed to a cluster 24 from the application deployment information 62 upon receiving a response from the cluster 24 that indicates the resource is no longer deployed on the cluster 24.

The operator 21 may interact with the dashboard 20 to request the deployment status of the containerized application 42-1. In response, the dashboard 20 accesses the placement rule 52 to obtain the list 56. The list 56 identifies a first set of clusters 24, in this example the clusters 24-1 and 24-2, on which the containerized application 42-1 is expected as being deployed. The dashboard 20 also accesses the application deployment information 62 to determine a second set of clusters 24 onto which resources of the containerized application 42-1 have actually been deployed. Preferably the first set of clusters 24 matches the second set of clusters 24. At the point in time illustrated in FIG. 1, the first set of clusters 24 and the second set of clusters 24 are the same. The dashboard 20 generates user interface imagery 64 that includes information that identifies a set of the plurality of resources of the containerized application 42-1, and identifies whether the first set of clusters 24 is the same as the second set of clusters 24. The dashboard 20 presents the user interface imagery 64 on the display device 18. The operator 21 can quickly and visually determine that the containerized application 42-1 is deployed on the appropriate clusters 24.

It is noted that the examples herein are illustrated as being executed on multiple computing devices 12 and 32, each of which may include one or more processor devices. The examples may therefore, in some implementations, be implemented on one or more processor devices of one or more computing devices.

Figure 2:
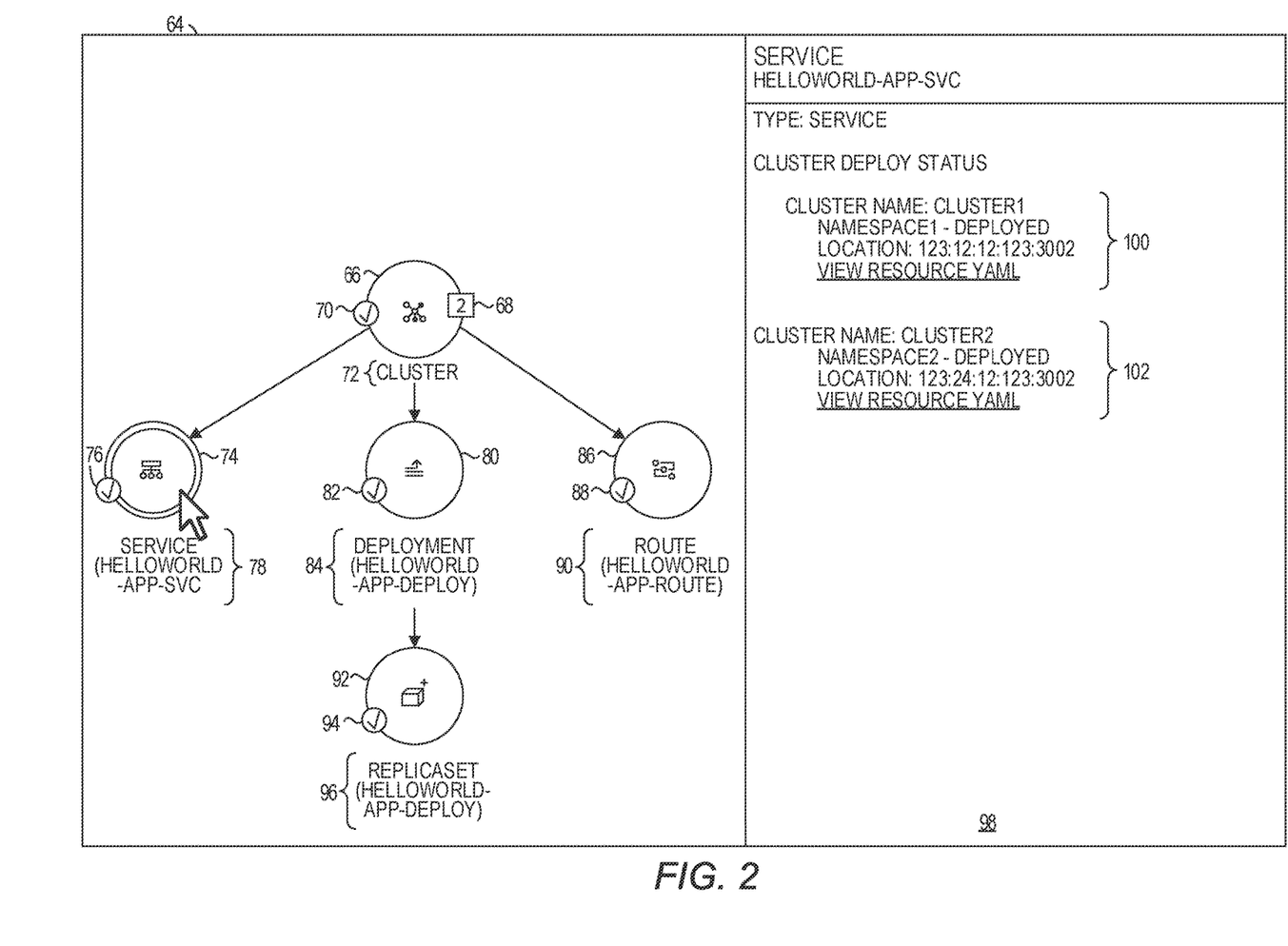
FIG. 2 illustrates user interface imagery that may be presented on a display device to identify whether deployment problems of a containerized application exist, according to one implementation.

FIG. 2 illustrates example user interface imagery 64 that may be presented on the display device 18 according to one example. In this example, the dashboard 20 determined that the first set of clusters 24 and the second set of clusters 24 are the same. The user interface imagery 64 includes a cluster resource icon 66 that represents the clusters 24 identified in the list 56 of the placement rule 52. A cluster count 68 identifies the number of clusters 24 identified in the list 56 of the placement rule 52 and thus identifies the number of current clusters 24 on which the containerized application 42-1 is expected to be deployed. In this example, the list 56 identifies the two clusters 24-1 and 24-2, and thus the cluster count 68 depicts a value of 2. A cluster status indicator 70 indicates that each of the clusters 24-1 and 24-2 have a status of healthy. This information may be obtained, for example, from the MCC 30 that maintains real-time cluster status information for each of the managed clusters 24-1-24-3. A different indicator may be used to indicate that one or more of the clusters 24-1 and 22-2 is not healthy. Text 72 identifies the cluster resource icon 66 as a cluster resource icon.

A service resource icon 74 corresponds to and represents the service resources deployed on the clusters 24-1 and 24-2, and includes a successful deployment indicator 76 that indicates that the service resource 48-2 was successfully deployed onto the clusters 24-1 and 24-2. A different indicator may be used to indicate that the service resource 48-2 was not deployed successfully into one or more of the clusters 24-1, 24-2, or if one of the clusters 24-1 or 24-2 is unreachable. Text 78 identifies the resource kind (service) and the name (helloworld-app-svc) of the service resources 48 deployed on the clusters 24-1 and 24-2.

A deployment resource icon 80 corresponds to and represents the deployment resources 48 deployed on the clusters 24-1 and 24-2, and includes a successful deployment indicator 82 that indicates that the deployment resource 48-1 was successfully deployed onto the clusters 24-1 and 24-2. A different indicator may be used to indicate that the deployment resource 48-1 was not deployed successfully into one or more of the clusters 24-1, 24-2, or if one of the clusters 24-1, 24-2 is unreachable. Text 84 identifies the resource kind (deployment) and the name (helloworld-app-deploy) of the deployment resources 48 deployed on the clusters 24-1 and 24-2.

A route resource icon 86 corresponds to and represents the route resources 48 deployed on the clusters 24-1 and 24-2, and includes a successful deployment indicator 88 that indicates that the route resource 48-3 was successfully deployed onto the clusters 24-1 and 24-2. A different indicator may be used to indicate that the route resource 48-3 was not deployed successfully into one or more of the clusters 24-1, 24-2, or if one of the clusters 24-1, 24-2 is unreachable. Text 90 identifies the resource kind (route) and the name (helloworld-app-route) of the route resources deployed on the clusters 24-1 and 24-2.

Based on the content of the deployment resource 48-1, the cluster controllers 28-1 and 28-2 deployed replicaset resources on the clusters 24-1 and 24-2. A replicaset resource icon 92 corresponds to the replicaset resources and includes a successful deployment indicator 94 to indicate that the replicaset resources have been successfully deployed on the clusters 24-1 and 24-2. Text 96 identifies the resource kind (replicaset) and the name (helloworld-app-deploy) of the replicaset resources, which is the same name of the deployment resources that caused the deployment of the replicaset resources.

In this example, the dashboard 20 may automatically, or in response to a user input selecting the service resource icon 74, include, in the user interface imagery 64, information 98 about the deploy status of the service resources on the clusters 24-1 and 24-2. A section 100 provides the deploy status of the service resource on the cluster 24-1 that includes the name of the cluster 24-1, the namespace in which the service resource was deployed, an IP address and port number of the service resource on the cluster 24-1, and a selectable link that, upon selection, will present the contents of the service resource from the cluster 24-1.

A section 102 provides the deploy status of the service resource on the cluster 24-2 that includes the name of the cluster 24-2, the namespace in which the service resource was deployed, an IP address and port number of the service resource on the cluster 24-2, and a selectable link that, upon selection, will present the contents of the service resource from the cluster 24-2.

Selection of any of the other resource icons 80, 86, and 92 would cause the generation and presentation of the status of the selected resource on the clusters 24-1 and 24-2.

Figure 3:
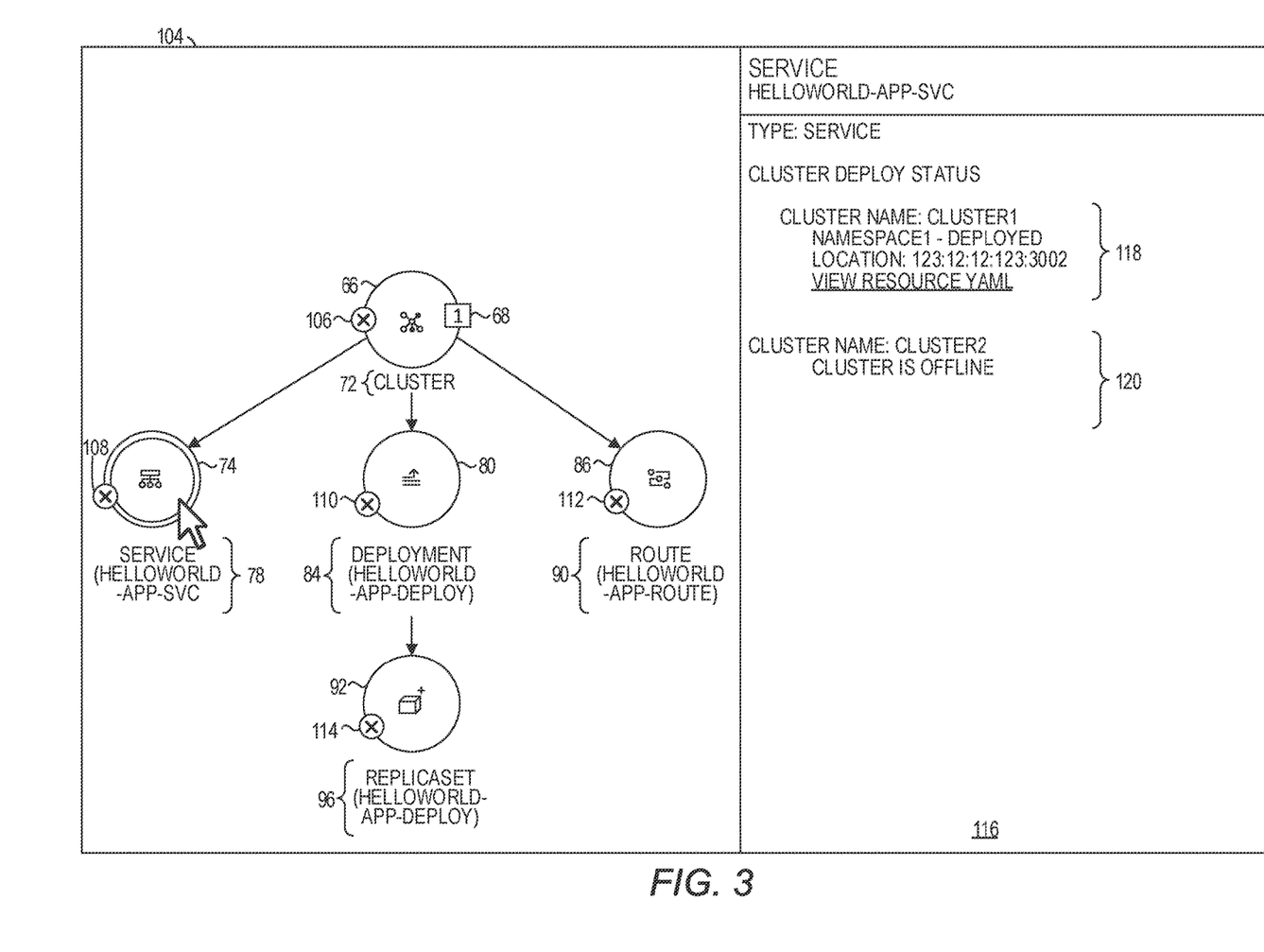
FIG. 3 illustrates user interface imagery that may be presented on a display device to identify whether deployment problems of a containerized application exist, according to another implementation.

FIG. 3 illustrates example user interface imagery 104 that may be presented on the display device 18 according to another example. In this example, at an instant in time prior to the generation of the user interface imagery 104, the MCC 30 was no longer able to communicate with the cluster controller 28-3. In response, the MCC 30 modified the list 56 to remove the cluster 24-3 from the list 56. The dashboard 20 subsequently received a request from the operator 21 for the deployment status of the containerized application 42-1.

In response to the request, the dashboard 20 accesses the placement rule 52 to obtain the list 56. The list 56 identifies a first set of clusters 24, in this example the cluster 24-1, on which the containerized application 42-1 is expected as being deployed. The list 56 no longer identifies the cluster 24-2 because the cluster 24-2 is no longer reachable. The dashboard 20 also accesses the application deployment information 62 to determine a second set of clusters 24 onto which resources of the containerized application 42-1 have actually been deployed. The application deployment information 62 indicates that the containerized application has been deployed on the clusters 24-1 and 24-2, and thus the second set of clusters 24 identifies the clusters 24-1 and 24-2.

The dashboard 20 generates the user interface imagery 104. The user interface imagery 104 includes the cluster icon 66 and resource icons 74, 80, 86 and 92. The cluster count 68 now contains a value of one to identify that, from the perspective of the placement rule 52, the containerized application 42-1 is expected to be deployed only on the cluster 24-1. The cluster icon 66 includes an error icon 106 to indicate that the first set of clusters 24 identified in the list 56 is different from the second set of clusters 24 obtained from the application deployment information 62. The resource icons 74, 80, 86, and 92 now also include error icons 108, 110, 112 and 114 to indicate deployment issues with the corresponding resources.

The dashboard 20 may automatically, or in response to a user input selecting the service resource icon 74, include in the user interface imagery 104 information 116 about the deploy status of the service resources on the clusters 24-1 and 24-2. A section 118 provides the deploy status of the service resource on the cluster 24-1 that includes the name of the cluster 24-1, the namespace in which the service resource was deployed, an IP address and port number of the service resource on the cluster 24-1, and a selectable link that, upon selection, will present the contents of the service resource from the cluster 24-1.

A section 120 indicates that the containerized application 42-1 is actually deployed on the cluster 24-2, but that the cluster 24-2 is unreachable (e.g., offline). The operator 21 can thus immediately determine that, although the placement rule 52 indicates that the containerized application 42-1 is expected to be deployed only on the cluster 24-1, the containerized application 42-1 has actually been deployed on both the clusters 24-1 and 24-2.

Figure 4:
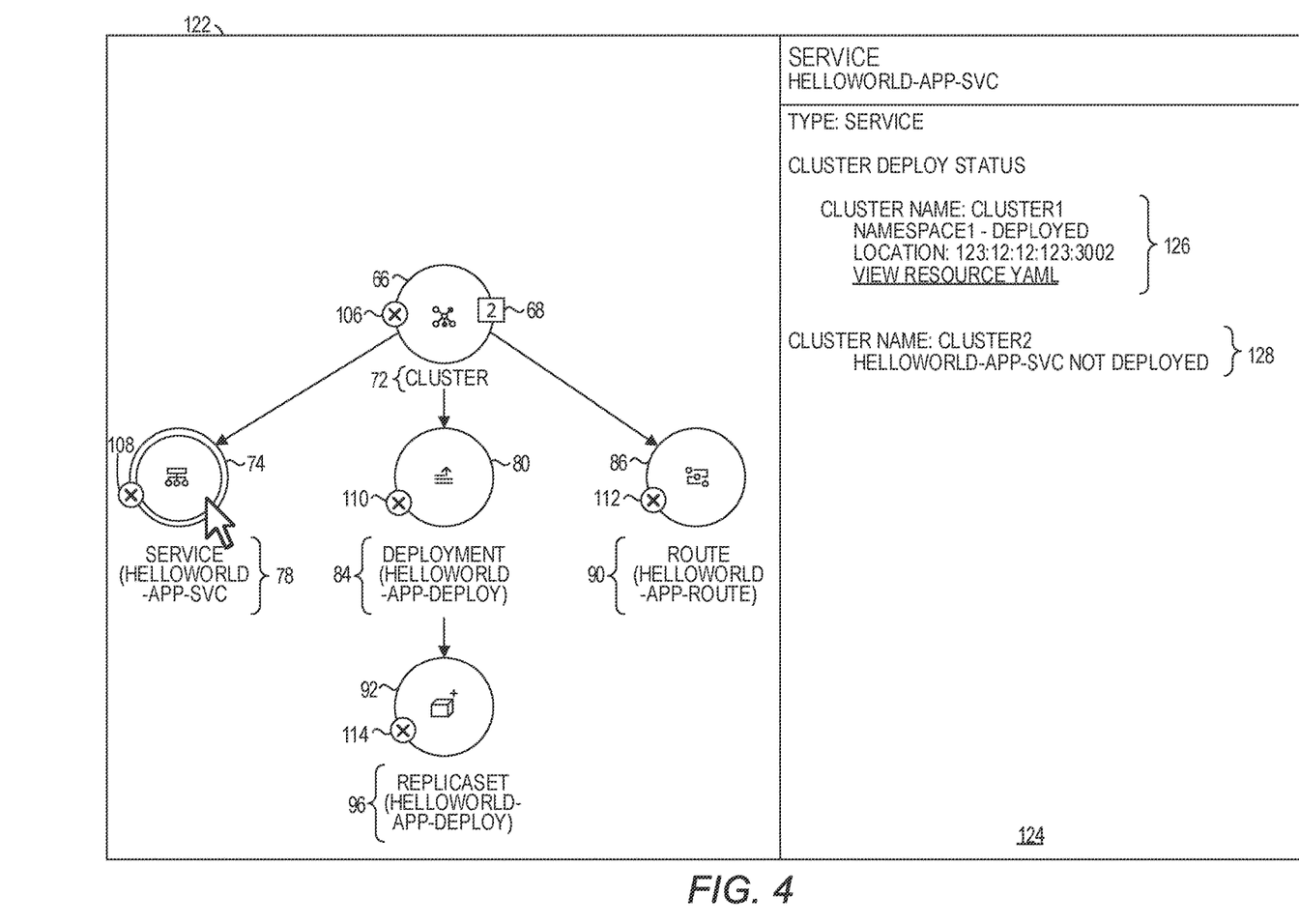
FIG. 4 illustrates user interface imagery that may be presented on a display device to identify whether deployment problems of a containerized application exist, according to another implementation.

FIG. 4 illustrates example user interface imagery 122 that may be presented on the display device 18 according to another example. In this example, the list 56 of the placement rule 52 indicates that the containerized application 42 is expected to be deployed on the clusters 24-1 and 24-2. However, the application deployment information 62 indicates that the containerized application 42 is only deployed on the cluster 24-1. The dashboard 20 receives a request from the operator 21 for the deployment status of the containerized application 42-1. In response to the request, the dashboard 20 accesses the placement rule 52 to obtain the list 56. The list 56 identifies a first set of clusters 24, in this example the clusters 24-1 and 24-2, on which the containerized application 42-1 is expected as being deployed. The dashboard 20 also accesses the application deployment information 62 to determine a second set of clusters 24 onto which resources of the containerized application 42-1 have actually been deployed. The application deployment information 62 indicates that the containerized application 42-1 has been deployed on only the cluster 24-1, and thus the second set of clusters 24 identifies only the cluster 24-1.

The dashboard 20 generates the user interface imagery 122. The user interface imagery 122 includes the cluster resource icon 66 and resource icons 74, 80, 86, and 92. The cluster count 68 now contains a value of two to identify that, from the perspective of the placement rule 52, the containerized application 42-1 is expected to be deployed only on the clusters 24-1 and 24-2. The cluster resource icon 66 includes an error icon 106 to indicate that the first set of clusters 24 identified in the list 56 is different from the second set of clusters 24 obtained from the application deployment information 62. The resource icons 74, 80, 86, and 92 also include the error icons 108, 110, 112, and 114 to indicate deployment issues with the corresponding resources.

The dashboard 20 may automatically, or in response to a user input selecting the service resource icon 74, include in the user interface imagery 122 information 124 about the deploy status of the service resources on the clusters 24-1 and 24-2. A section 126 provides the deploy status of the service resource on the cluster 24-1 that includes the name of the cluster 24-1, the namespace in which the service resource was deployed, an IP address and port number of the service resource on the cluster 24-1, and a selectable link that, upon selection, will present the contents of the service resource from the cluster 24-1.

A section 128 indicates that the service resource was not deployed on the cluster 24-2. In this example, it is assumed that none of the resources of the containerized application 42-1 were deployed on the cluster 24-2, and thus, selection of any of the other resource icons 80, 86, or 92 would also result in the generation and presentation of user interface imagery that indicates that the corresponding resource was not deployed on the cluster 24-2. However, in other examples, only certain resources of a containerized application may not be deployed on a cluster 24. In such examples, only the resource icons that correspond to such undeployed resources include an error icon, and other resource icons that correspond to resources that were successfully deployed on the cluster 24-2 have successful deployment icons, as illustrated in FIG. 2. Thus, the operator 21 can immediately determine, in such examples, those resources that were successfully deployed and those that were not.

Figure 5:
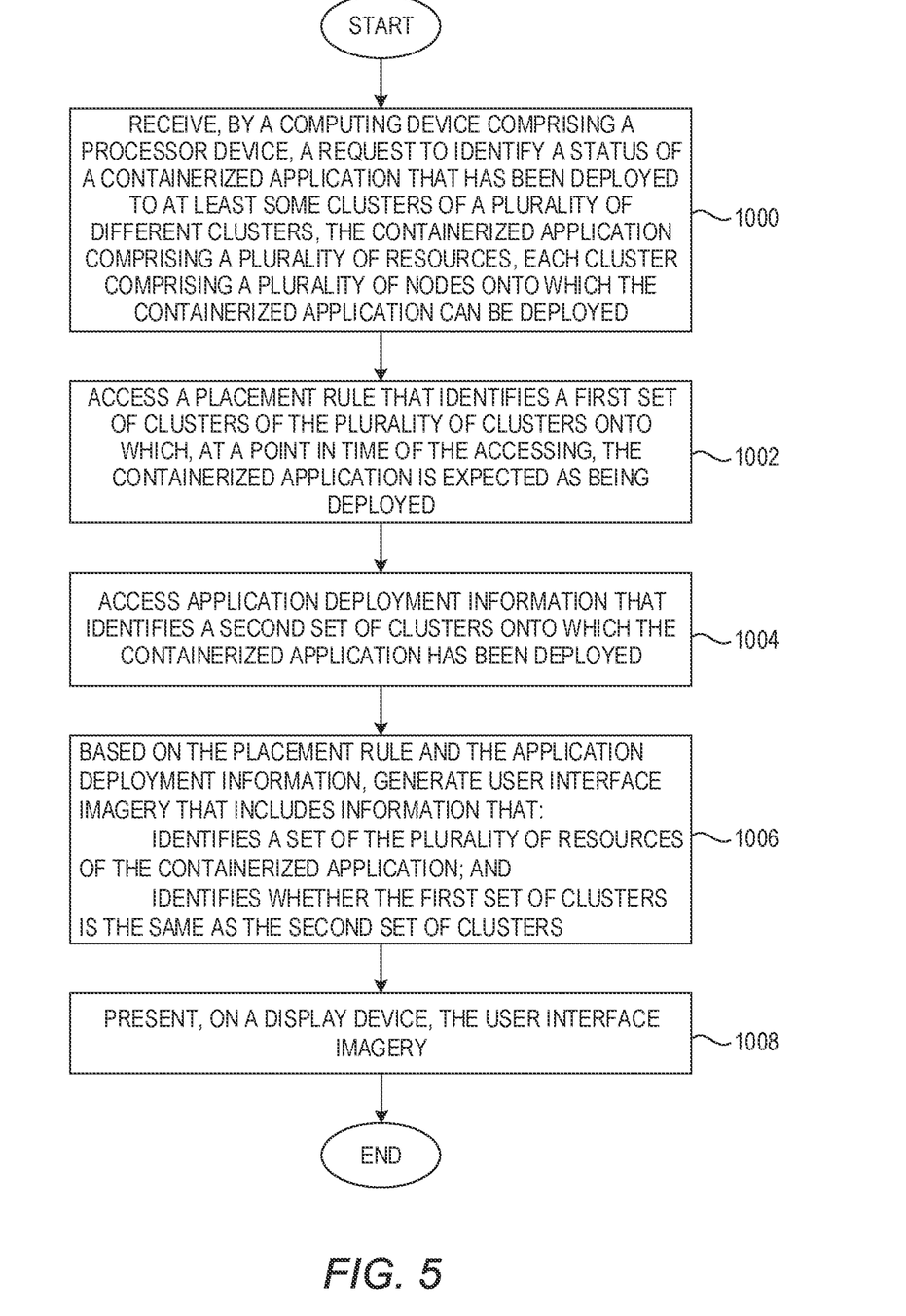
FIG. 5 is a flowchart of a method for detecting deployment problems of containerized applications in a multiple-cluster environment according to one example.

FIG. 5 is a flowchart of a method for detecting deployment problems of containerized applications in a multiple-cluster environment according to one implementation. FIG. 5 will be discussed in conjunction with FIG. 1. The computing device 32 receives a request to identify a status of the containerized application 42-1 that has been deployed to at least some clusters 24 of the plurality of different clusters 24-1-24-3, the containerized application 42-1 comprising the plurality of resources 48, each cluster 24 comprising a plurality of nodes onto which the containerized application 42-1 can be deployed (FIG. 5, block 1000). The computing device 32 accesses the placement rule 52 that identifies the first set of clusters 24 of the plurality of clusters 24-1-24-3 onto which, at a point in time of the accessing, the containerized application 42-1 is expected as being deployed (FIG. 5, block 1002). The computing device 32 accesses the application deployment information 62 that identifies a second set of clusters 24 onto which the containerized application 42-1 has been deployed (FIG. 5, block 1004). The computing device 32, based on the placement rule 52 and the application deployment information 62, generates user interface imagery that includes information that: identifies a set of the plurality of resources of the containerized application 42-1, and identifies whether the first set of clusters 24 is the same as the second set of clusters 24 (FIG. 5, block 1006). The computing device 32 presents, on the display device 18, the user interface imagery (FIG. 5, block 1008).

Figure 6:
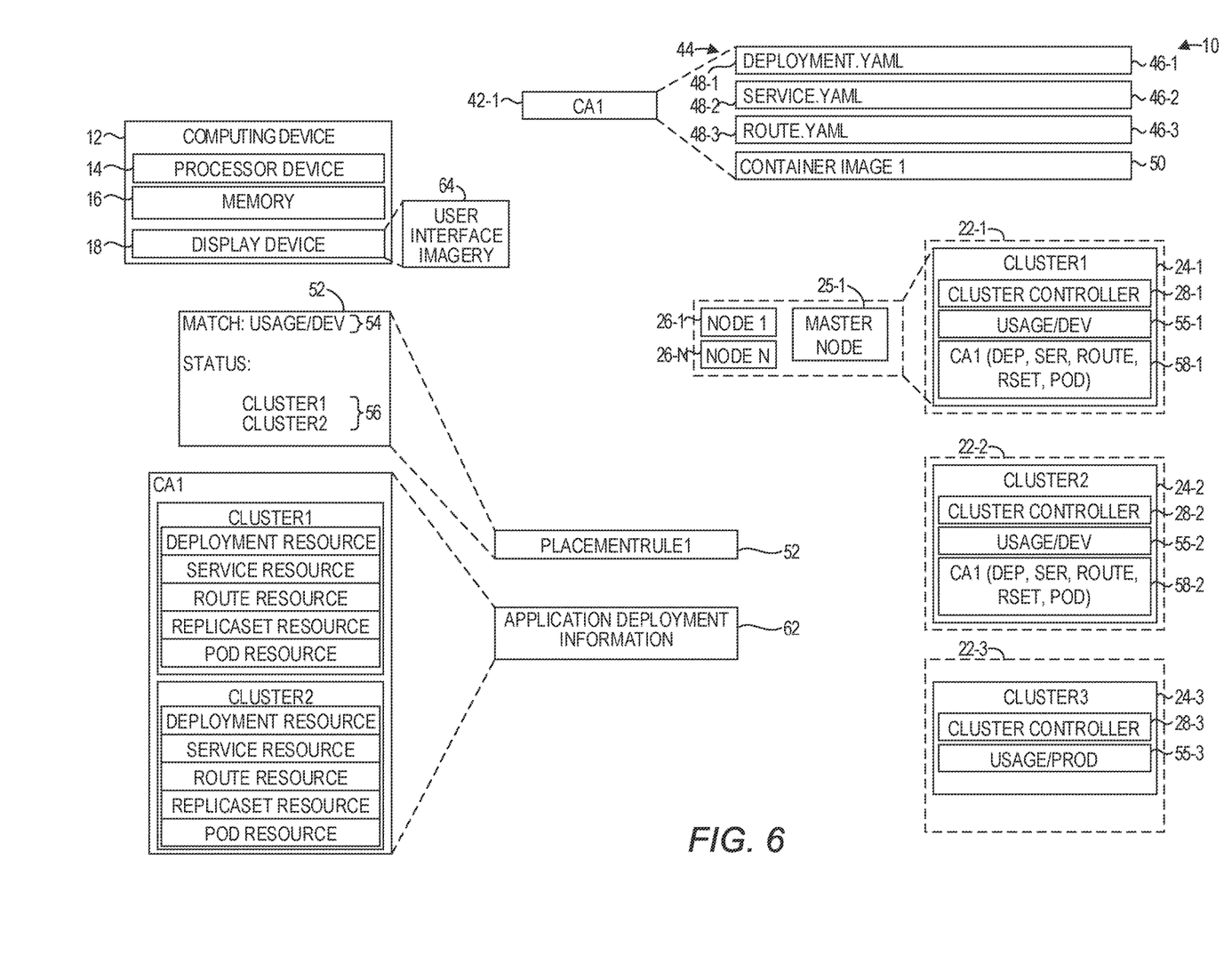
FIG. 6 is a simplified block diagram of the runtime environment illustrated in FIG. 1 according to one example.

FIG. 6 is a simplified block diagram of the runtime environment 10 illustrated in FIG. 1 according to one example. The environment 10 includes the computing device 12, which in turn includes the memory 16 and the processor device 14 coupled to the memory 16. The processor device 14 is to receive a request to identify a status of the containerized application 42-1 that has been deployed to at least some clusters 24 of the plurality of different clusters 24-1-24-3. The containerized application 42-1 includes the plurality of resources 48-1-48-3, each cluster 24 comprising a plurality of nodes 26 onto which the containerized application 42-1 can be deployed. The processor device 14 is further to access the placement rule 52 that identifies the first set of clusters 24-1-24-2 of the plurality of different clusters 24-1-24-3 onto which, at a point in time of the accessing, the containerized application 42-1 is expected as being deployed. The processor device 14 is further to access the application deployment information 62 that identifies the second set of clusters 24-1 and 24-2 onto which the containerized application 42-1 has been deployed. The processor device 14 is further to, based on the placement rule 52 and the application deployment information 62, generate the user interface imagery 64 that includes information that identifies the set 58-1 of the plurality of resources of the containerized application 42-1, and identifies whether the first set of clusters is the same as the second set of clusters. The processor device 14 is further to present, on the display device 18, the user interface imagery 64.

Figure 7:
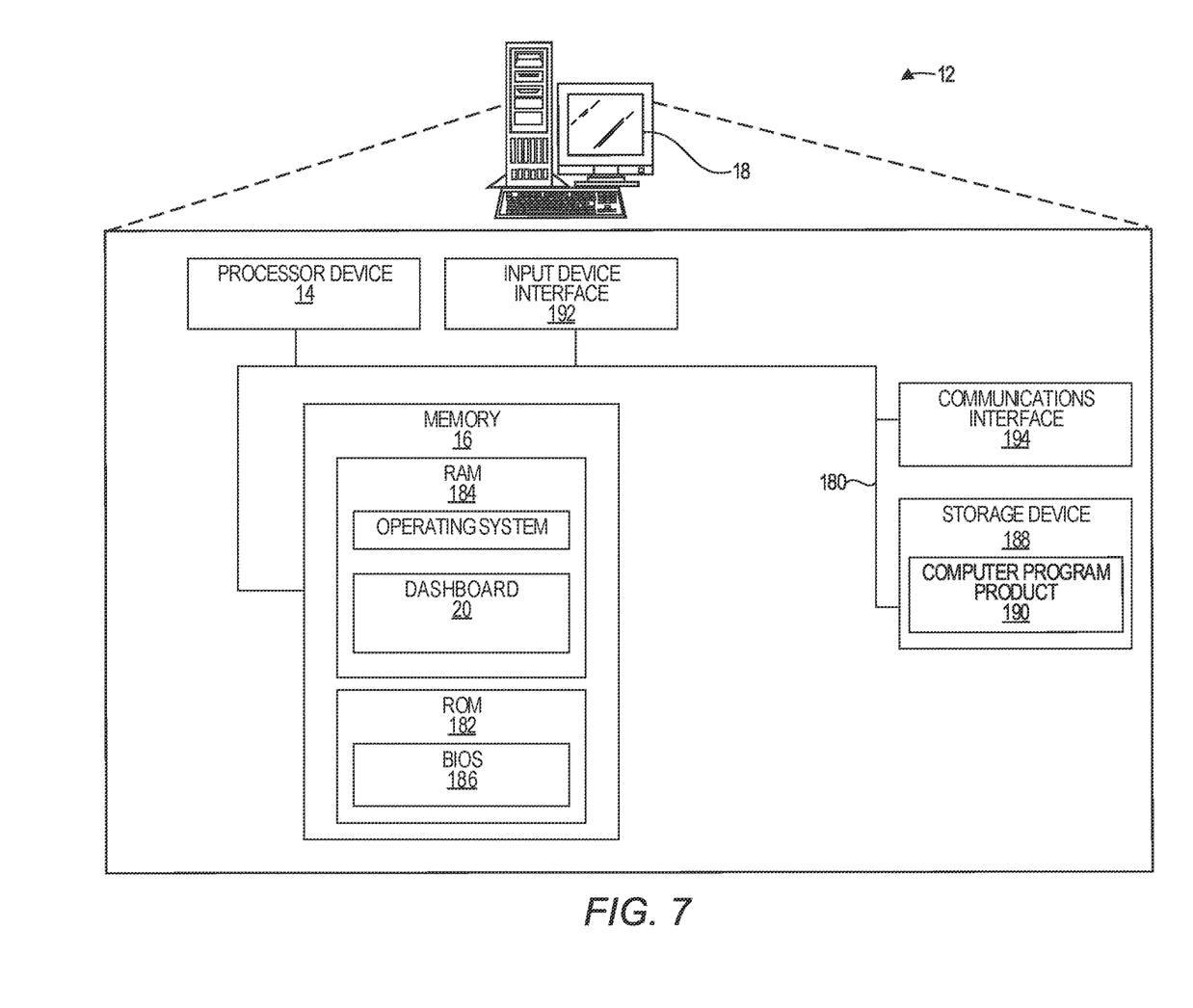
FIG. 7 is a block diagram of a computing device suitable for implementing examples according to one example.

FIG. 7 is a block diagram of the computing device 12 suitable for implementing examples according to one example. The computing device 12 may comprise any computing or electronic device capable of including firmware, hardware, and/or executing software instructions to implement the functionality described herein, such as a computer server, a desktop computing device, a laptop computing device, or the like. The computing device 12 includes the processor device 14, the system memory 16, and a system bus 180. The system bus 180 provides an interface for system components including, but not limited to, the system memory 16 and the processor device 14. The processor device 14 can be any commercially available or proprietary processor.

The system bus 180 may be any of several types of bus structures that may further interconnect to a memory bus (with or without a memory controller), a peripheral bus, and/or a local bus using any of a variety of commercially available bus architectures. The system memory 16 may include non-volatile memory 182 (e.g., read-only memory (ROM), erasable programmable read-only memory (EPROM), electrically erasable programmable read-only memory (EEPROM), etc.), and volatile memory 184 (e.g., random-access memory (RAM)). A basic input/output system (BIOS) 186 may be stored in the non-volatile memory 182 and can include the basic routines that help to transfer information between elements within the computing device 12. The volatile memory 184 may also include a high-speed RAM, such as static RAM, for caching data.

The computing device 12 may further include or be coupled to a non-transitory computer-readable storage medium such as a storage device 188, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 188 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 188 and in the volatile memory 184, including an operating system and one or more program modules, such as the dashboard 20, which may implement the functionality described herein in whole or in part.

All or a portion of the examples may be implemented as a computer program product 190 stored on a transitory or non-transitory computer-usable or computer-readable storage medium, such as the storage device 188, which includes complex programming instructions, such as complex computer-readable program code, to cause the processor device 14 to carry out the steps described herein. Thus, the computer-readable program code can comprise software instructions for implementing the functionality of the examples described herein when executed on the processor device 14. The processor device 14, in conjunction with the dashboard 20 in the volatile memory 184, may serve as a controller, or control system, for the computing device 12 that is to implement the functionality described herein.

An operator may also be able to enter one or more configuration commands through a keyboard (not illustrated), a pointing device such as a mouse (not illustrated), or a touch-sensitive surface such as the display device 18. Such input devices may be connected to the processor device 14 through an input device interface 192 that is coupled to the system bus 180 but can be connected by other interfaces such as a parallel port, an Institute of Electrical and Electronic Engineers (IEEE) 1394 serial port, a Universal Serial Bus (USB) port, an IR interface, and the like. The computing device 12 may also include a communications interface 194, such as an Ethernet transceiver, suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
receiving, by a computing system comprising one or more processor devices, a request to identify a status of a containerized application that has been deployed to at least some clusters of a plurality of different clusters, the containerized application comprising a plurality of resources, each cluster comprising a plurality of nodes onto which the containerized application can be deployed;
accessing a placement rule that identifies a first set of clusters of the plurality of different clusters onto which, at a point in time of the accessing, the containerized application is expected as being deployed;
accessing application deployment information that identifies a second set of clusters onto which the containerized application has been deployed;
based on the placement rule and the application deployment information, generating user interface imagery that includes information that:
identifies a set of the plurality of resources of the containerized application; and
identifies whether the first set of clusters is the same as the second set of clusters; and
presenting, on a display device, the user interface imagery.

2. The method of claim 1 wherein the user interface imagery includes a plurality of resource icons, each resource icon corresponding to one of the resources in the set, wherein the first set of clusters is not the same as the second set of clusters, and wherein the information that identifies whether the first set of clusters is the same as the second set of clusters comprises an error icon presented in conjunction with at least one resource icon corresponding to at least one resource.

3. The method of claim 2 further comprising:
receiving user input that selects the at least one resource icon; and
in response to the user input, generating additional user interface imagery that identifies that the at least one resource has not been deployed on at least one cluster that is identified in the first set of clusters and not identified in the second set of clusters.

4. The method of claim 2 further comprising:
receiving user input that selects the at least one resource icon; and
in response to the user input, generating additional user interface imagery that identifies that the at least one resource has been deployed on at least one cluster that is identified in the second set of clusters and not identified in the first set of clusters.

5. The method of claim 1 wherein the second set of clusters identifies a cluster not identified in the first set of clusters, and further comprising:
including, in the user interface imagery, information that identifies the cluster not identified in the first set of clusters, and information that indicates that the cluster not identified in the first set of clusters is unreachable by a multi-cluster controller that manages the plurality of different clusters.

6. The method of claim 1 wherein the first set of clusters identifies a cluster not identified in the second set of clusters, and further comprising:
including, in the user interface imagery, information that identifies the cluster not identified in the second set of clusters, and information that indicates that the containerized application is not deployed on the cluster not identified in the second set of clusters.

7. The method of claim 1 further comprising:
periodically:
identifying the plurality of different clusters;
querying each cluster of the plurality of different clusters for a list of resources deployed on the cluster;
receiving, from each cluster of the plurality of different clusters, a corresponding list of resources deployed on the respective cluster;
determining, for each list of resources received from a cluster, whether a resource of the plurality of resources of the containerized application has been deployed on the cluster; and
generating the application deployment information to include information that identifies each respective cluster on which at least one resource of the plurality of resources has been deployed, and for each such respective cluster, the resources of the plurality of resources that have been deployed on the respective cluster.

8. The method of claim 7 wherein determining, for each list of resources received from the cluster, whether the resource of the plurality of resources of the containerized application has been deployed on the cluster comprises:
determining an application label that corresponds to the containerized application; and
determining whether each resource in the list of resources includes the application label.

9. The method of claim 1 wherein the first set of clusters comprises those clusters that match a characteristic and that have a status of active.

10. The method of claim 1 further comprising:
including in the user interface imagery, for each respective deployed resource in a set of deployed resources, a resource icon that represents the respective deployed resource.

11. A computing system, comprising:
one or more computing devices comprising one or more processor devices, the one or more processor devices to:
receive a request to identify a status of a containerized application that has been deployed to at least some clusters of a plurality of different clusters, the containerized application comprising a plurality of resources, each cluster comprising a plurality of nodes onto which the containerized application can be deployed;
access a placement rule that identifies a first set of clusters of the plurality of different clusters onto which, at a point in time of the accessing, the containerized application is expected as being deployed;
access application deployment information that identifies a second set of clusters onto which the containerized application has been deployed;
based on the placement rule and the application deployment information, generate user interface imagery that includes information that:
identifies a set of the plurality of resources of the containerized application; and
identifies whether the first set of clusters is the same as the second set of clusters; and
present, on a display device, the user interface imagery.

12. The computing system of claim 11 wherein the user interface imagery includes a plurality of resource icons, each resource icon corresponding to one of the resources in the set, wherein the first set of clusters is not the same as the second set of clusters, and wherein the information that identifies whether the first set of clusters is the same as the second set of clusters comprises an error icon presented in conjunction with at least one resource icon corresponding to at least one resource.

13. The computing system of claim 12 wherein the one or more processor devices are further to:
receive user input that selects the at least one resource icon; and
in response to the user input, generate additional user interface imagery that identifies that the at least one resource has not been deployed on at least one cluster that is identified in the first set of clusters and not identified in the second set of clusters.

14. The computing system of claim 12 wherein the one or more processor devices are further to:
receive user input that selects the at least one resource icon; and
in response to the user input, generate additional user interface imagery that identifies that the at least one resource has been deployed on at least one cluster that is identified in the second set of clusters and not identified in the first set of clusters.

15. The computing system of claim 11 wherein the one or more processor devices are further to:
periodically:
identify the plurality of different clusters;
query each cluster of the plurality of different clusters for a list of resources deployed on the cluster;
receive, from each cluster of the plurality of different clusters, a corresponding list of resources deployed on the respective cluster;
determine, for each list of resources received from a cluster, whether a resource of the plurality of resources of the containerized application has been deployed on the cluster; and
generate the application deployment information to include information that identifies each respective cluster on which at least one resource of the plurality of resources has been deployed, and for each such respective cluster, the resources of the plurality of resources that have been deployed on the respective cluster.

16. A non-transitory computer-readable storage medium that includes executable instructions to cause one or more processor devices to:
    receive a request to identify a status of a containerized application that has been deployed to at least some clusters of a plurality of different clusters, the containerized application comprising a plurality of resources, each cluster comprising a plurality of nodes onto which the containerized application can be deployed;
    access a placement rule that identifies a first set of clusters of the plurality of different clusters onto which, at a point in time of the accessing, the containerized application is expected as being deployed;
    access application deployment information that identifies a second set of clusters onto which the containerized application has been deployed;
    based on the placement rule and the application deployment information, generate user interface imagery that includes information that:
        identifies a set of the plurality of resources of the containerized application; and
        identifies whether the first set of clusters is the same as the second set of clusters; and
    present, on a display device, the user interface imagery.

17. The non-transitory computer-readable storage medium of claim 16 wherein the user interface imagery includes a plurality of resource icons, each resource icon corresponding to one of the resources in the set, wherein the first set of clusters is not the same as the second set of clusters, and wherein the information that identifies whether the first set of clusters is the same as the second set of clusters comprises an error icon presented in conjunction with at least one resource icon corresponding to at least one resource.

18. The non-transitory computer-readable storage medium of claim 17 wherein the instructions further cause the one or more processor devices to:
    receive user input that selects the at least one resource icon; and
    in response to the user input, generate additional user interface imagery that identifies that the at least one resource has not been deployed on at least one cluster that is identified in the first set of clusters and not identified in the second set of clusters.

19. The non-transitory computer-readable storage medium of claim 17 wherein the instructions further cause the one or more processor devices to:
    receive user input that selects the at least one resource icon; and
    in response to the user input, generate additional user interface imagery that identifies that the at least one resource has been deployed on at least one cluster that is identified in the second set of clusters and not identified in the first set of clusters.

20. The non-transitory computer-readable storage medium of claim 16 wherein the instructions further cause the one or more processor devices to:
    periodically:
        identify the plurality of different clusters;
        query each cluster of the plurality of different clusters for a list of resources deployed on the cluster;
        receive, from each cluster of the plurality of different clusters, a corresponding list of resources deployed on the respective cluster;
        determine, for each list of resources received from a cluster, whether a resource of the plurality of resources of the containerized application has been deployed on the cluster; and
        generate the application deployment information to include information that identifies each respective cluster on which at least one resource of the plurality of resources has been deployed, and for each such respective cluster, the resources of the plurality of resources that have been deployed on the respective cluster.

\* \* \* \* \*